H. U. JOHNSON.
HEALTH-LIFT.
No. 177,251. Patented May 9, 1876.
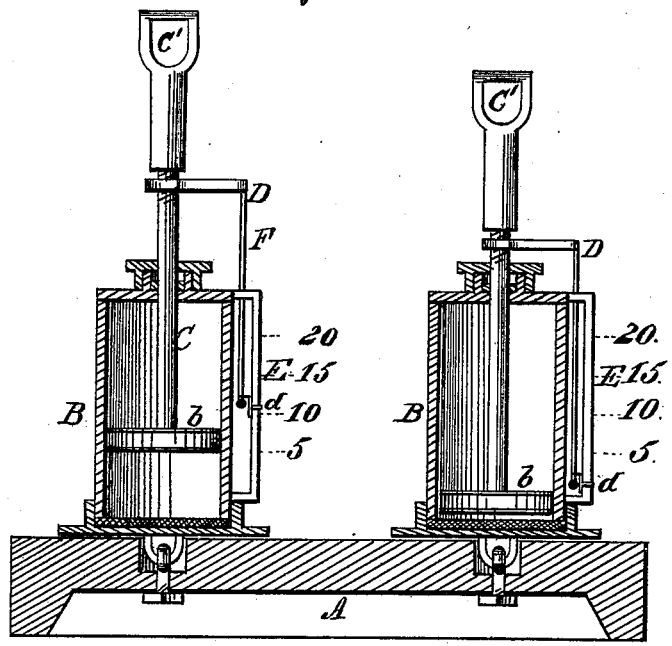
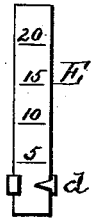
WITNESSES
E. I. Nottingham
Wm H. Brereton Jr
INVENTOR
Homer U. Johnson
By Leggett & Leggett Attorneys.

UNITED STATES PATENT OFFICE.

HOMER U. JOHNSON, OF ORWELL, OHIO.

IMPROVEMENT IN HEALTH-LIFTS.

Specification forming part of Letters Patent No. 177,251, dated May 9, 1876; application filed December 3, 1875.

*To all whom it may concern:*

Be it known that I, HOMER U. JOHNSON, of Orwell, in the county of Ashtabula, and State of Ohio, have invented certain new and useful Improvements in Health-Lift; and I do hereby declare the following to be a full, clear, and exact description of the invention, such as will enable others skilled in the art to which it pertains to make and use it, reference being had to the accompanying drawings, which form part of this specification.

My invention relates to an improvement in gymnastic apparatus of that description popularly known as the health-lift.

In the drawing, Figure 1 represents a cross-section of a health-lift embodying my invention, and Fig. 2 the scale and indicator.

It consists in the following parts and combinations, as hereinafter specified and claimed, wherein—

A is any suitable bed-plate or base, to which is loosely, yet securely, fastened, in any appropriate manner, the air-pumps B. The pistons $b$ of the air-pumps B are provided with a piston-rod, C, which extends upward through the end of the cylinder B. Upon that portion of the piston-rods outside the cylinder is formed a screw-thread. C' are suitable handles, in which are formed female screws, which fit upon the male screws of the piston-rods. By this provision the handle operating the pistons $b$ may be raised or lowered at pleasure in an obvious manner. D is an arm projecting from the piston-rod C, which operates the indicator $d$, said indicator moving upon a graduated scale, E, and so arranged that it shall remain stationary at the highest point to which it is lifted.

This indicator $d$ is a piece of suitable size and material, composed of a body portion, with an overlocking arm on either side, which embraces the scale E, and slides thereon, as in the groove-and-tongue movement.

At the extremity of the arm D is rigidly attached a vertical rod, F, which, extending down between the scale E and the slide of the air-pump B, passes through an aperture in a lip which is turned up from the body of the indicator $d$, and swells out at its lower extremity into an enlarged head.

Such aperture is of smaller diameter than the swelled or headed lower terminus of the rod F, so that, as said enlarged extremity is drawn up in the ascent of the rod F, it abuts against the indicator and carries the latter with it.

The arms of the indicator clasp the scale E sufficiently snug so as to allow of its adjustment subject to applied force, but not to admit of its descent by its own gravity; hence, being placed at the foot of the scale E, as the operator commences his exercise the indicator $d$ is subject to the rising action of the rod F, and marks its upward progress, remaining stationary at its extreme rise, thus registering the power exerted.

It is obvious that as the handles C' are pulled upward the air in the cylinder B above the piston will be compressed, and the resistance afforded by this compressed air constitutes the force against which the gymnastic efforts are directed. As the handles are raised the indicators $d$ are also lifted by the arm D, and these indicators, remaining stationary at the highest point to which they are lifted, indicate the maximum degree of force exerted.

I do not limit myself in any manner to the exact construction of my device as herein described.

What I claim is—

1. In a health-lift the air-pump B, in combination with the indicator $d$, vertically adjustable upon the exterior lateral scale E, substantially as set forth.

2. The health-lift composed of the exhaust or compressed air-pumps B B, provided with pistons $b\ b$, piston-rods $c\ c$, and handles $c'\ c'$, in combination with the arm D, rod F, scale E, and indicator $d$, all constructed and arranged substantially as set forth.

In testimony whereof I have signed my name to this specification in the presence of two subscribing witnesses.

HOMER U. JOHNSON.

Witnesses:
W. A. JOHNSON,
CURTIS W. LUND.